Jan. 10, 1961   H. L. ORWIG   2,967,718
REMOVABLE COUNTERWEIGHT
Filed April 22, 1959   2 Sheets-Sheet 1

INVENTOR.
HERBERT L. ORWIG
BY Kenneth C. Witt
ATTORNEY

Jan. 10, 1961 H. L. ORWIG 2,967,718
REMOVABLE COUNTERWEIGHT
Filed April 22, 1959 2 Sheets-Sheet 2

INVENTOR.
HERBERT L. ORWIG
BY
Kenneth C. Witt
ATTORNEY

United States Patent Office 2,967,718
Patented Jan. 10, 1961

2,967,718

REMOVABLE COUNTERWEIGHT

Herbert L. Orwig, Batavia, N.Y., assignor to Clark Equipment Company, a corporation of Michigan Filed Apr. 22, 1959, Ser. No. 808,060

2 Claims. (Cl. 280—150)

This invention relates to counterweighted vehicles and more particularly to removable counterweights. Many types of vehicles such as fork trucks and other material handling machines and tractor shovels, excavator cranes and other construction machinery utilize counterweights in order to increase the lifting and/or carrying capacity of the vehicle. The counterweight ordinarily is arranged adjacent one end extremity of the vehicle in order to counterbalance load engaging means at the opposite extremity.

It is frequently desirable to make such counterweights removable in order to lighten the weight of the vehicle for transport over the highway or for transport by air. It will be appreciated that there are weight restrictions applicable on most highways and very rigid weight limitations applicable to air transport; and such restrictions and limitations often make it necessary to transport a counterweighted vehicle separately from its counterweight in order to minimize the weight of the heaviest piece.

The object of the present invention is to provide a simpler and less expensive removable counterweight construction for vehicles than constructions which have been used for this purpose heretofore.

In carrying out my invention in one form I provide a vehicle having a frame which includes a pair of parallel horizontally disposed frame members. The counterweight is provided with lugs on the top for engaging the frame members and suspending the counterweight below the frame, and means are provided whereby the counterweight may be removed from the vehicle by moving it longitudinally of the frame members.

For a clearer and more complete understanding of my invention, reference should be had to the accompanying drawing in which.

Figure 1:
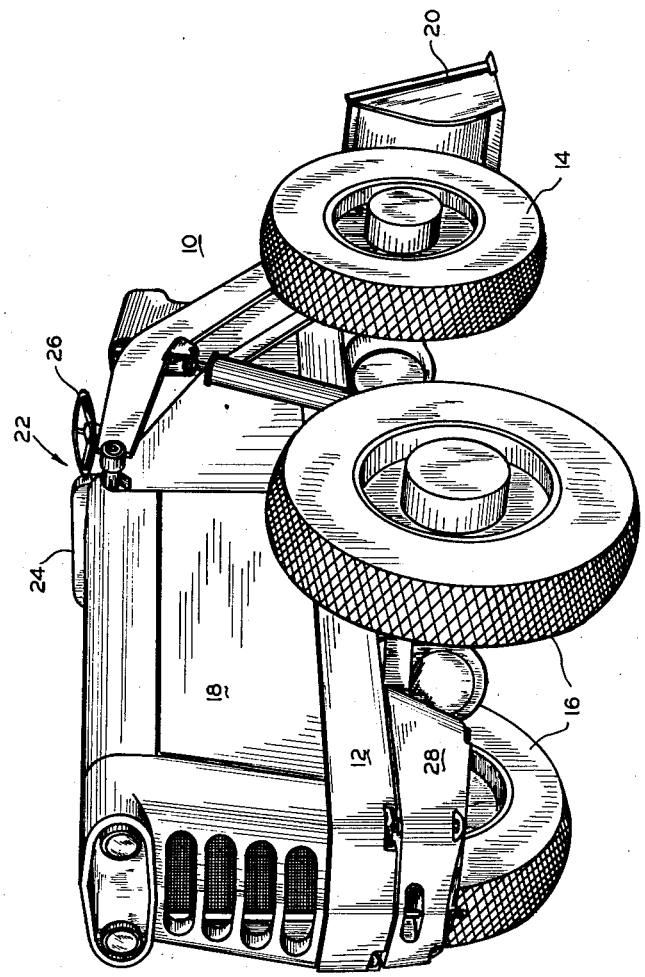
Figure 1 is a perspective view of a tractor shovel vehicle embodying a preferred form of my invention.

Referring to Fig. 1 of the drawing, the numeral 10 indicates generally a tractor shovel or front end loader or bulk loader as machines of this type are sometimes called. The machine 10 includes a main frame or chassis 12 and is supported on a pair of front wheels 14, only one of which appears in Fig. 1, and a pair of rear wheels 16. The vehicle 10 includes a body portion 18 mounted on the frame and an engine (not shown) within the body portion for propelling the vehicle and for providing power for performing digging or loading operations or the like with a bucket or scoop 20 located at the front of the machine. The vehicle 10 also includes an operator's station indicated generally at 22, including a seat 24 and an operator's steering wheel 26, where the operator is located when operating the vehicle. Also located at the operator's station but not appearing in Fig. 1 are the necessary levers and other control devices for operating the vehicle 10 in forward and reverse and for operating the bucket 20 in various ways in the digging, loading and/or transporting of earth or other bulk material.

The machine 10 is provided with a counterweight 28 at the rear to counterbalance loads handled by the bucket 20 and thereby increase the load handling capacity of the machine. The counterweight 28 is readily removable in the manner described in detail hereinafter.

Figure 2:
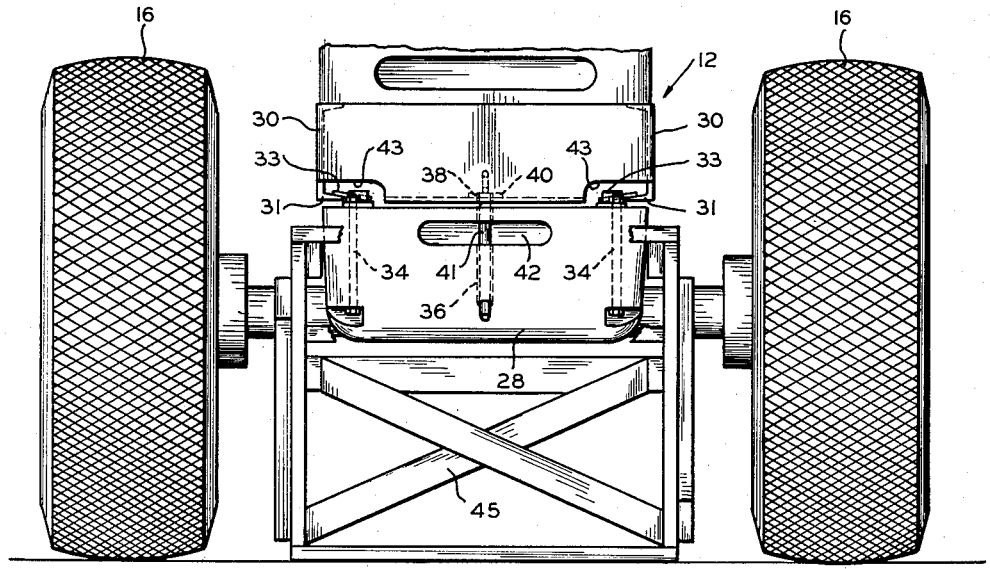
Figure 2 is a partial rear elevation of the vehicle of Fig. 1.
Figure 3:
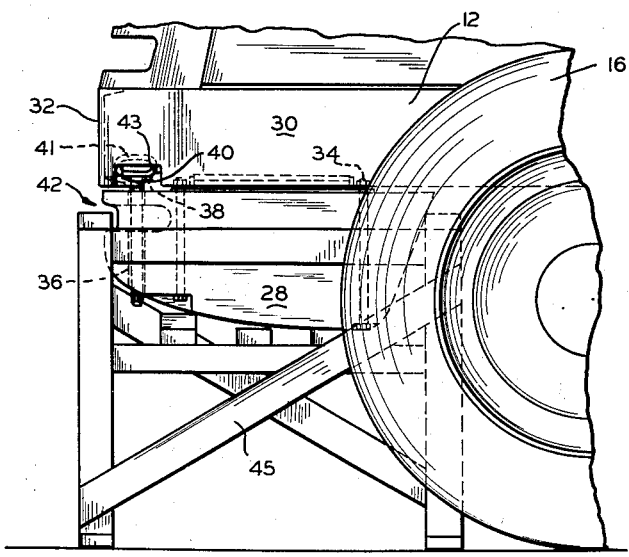
Figure 3 is a side elevational view partially in section of the same vehicle.

As best seen in Figs. 2 and 3 of the drawing, the frame 12 includes a pair of side members 30 and an outwardly curved transverse member 32 at the rear end connecting the two side members 30. As illustrated, these frame members are channel shaped steel pieces which have been welded together to form a portion of the main frame of the vehicle 10. Each of the side members 30 has an inwardly extending projection 31 at the bottom as seen in Fig. 2.

Counterweight 28 is suspended beneath the frame members 30 by means of lug portions 33 which are secured to the top of counterweight 28 and extend outwardly as illustrated so that they overlie the inner projections 31 on the side frame members and thereby support the counterweight. As shown, the lugs 33 are secured to the counterweight by means of nut and bolt connections 34, but it will be understood that the lugs 33 may be formed integrally with the counterweight 28 if desired.

In order to hold the counterweight in position on the vehicle frame for normal operation, a pin connection is provided. The counterweight 28 includes a vertically extending aperture 36 and there is provided a mating aperture 38 in a boss member or projection 40 which extends rearwardly from transverse frame member 32 centrally thereof. A pin 41 is inserted through the aligned apertures 36 and 38 from above in order to secure the counterweight to the vehicle. A transverse slot or groove 42 may be provided in the rear face of the counterweight giving access to the pin 40 whereby the pin may be used for a second purpose, namely, as a hitch for a trailer or other vehicle to be towed by vehicle 10.

To permit removal of the counterweight from the machine, the rear frame member 32 is provided with cut-out portions or openings 43 at the lower corner as illustrated in Fig. 2. After the pin 41 has been removed, the counterweight may be removed by sliding it rearwardly or alternatively by holding the counterweight and driving the vehicle forwardly. In either case the counterweight is disengaged from the frame 12 of the vehicle by the lugs 33 passing rearwardly through apertures 43 in the rear frame members 32.

To facilitate removal of the counterweight, a framework 45 may be used to support the counterweight while the vehicle is driven forwardly, and I have illustrated in Figs. 2 and 3 such a framework which may be made of wood.

While I have illustrated and described my invention herein in a preferred form for use with a tractor shovel machine, it will be readily appreciated that the invention is equally useful with other material handling and construction machinery which require a removable counterweight. It should be understood that I intend to cover by the appended claims all modifications and embodiments of removable counterweight structures which fall within the true spirit and scope of my invention.

I claim:

1. In a counterweighted vehicle, a frame having a pair of parallel spaced apart horizontally disposed side frame members and a transversely disposed end member joining the said side members, each said side frame member including an inturned projection near the bottom thereof, a counterweight adapted to be removably supported on the said side frame members, the said counterweight including a pair of parallel spaced apart lug portions on the top thereof, the said lug portions extending upwardly and outwardly and being adapted to engage the said inturned projections on the said side frame members, the said end member of the frame having cut-out portions for allowing the removal of the said counterweight longitudinally of the said side frame members, the said lug portions on the counterweight passing through the said cut-out portions when the counterweight is removed, and removable pin means adapted to connect the said counterweight to the said frame for holding it thereon, the said removable pin means comprising an inturned projection on the said transversely disposed end member having a vertically disposed aperture therein, a vertically disposed aperture in the said counterweight adapted to align with the said first mentioned aperture, and a pin adapted to be removably positioned in the said aligned apertures.

2. In a counterweighted vehicle, a frame having a pair of parallel spaced apart horizontally disposed side frame members and a transversely disposed end member joining the said side members, each said side frame member including an inturned projection near the bottom thereof, a counterweight adapted to be removably supported on the said side frame members, the said counterweight including a pair of parallel spaced apart lug portions on the top thereof, the said lug portions extending upwardly and outwardly and being adapted to engage the said inturned projections on the said side frame members, the said end member of the frame having cut-out portions for allowing the removal of the said counterweight longitudinally of the said side frame members, the said lug portions on the counterweight passing through the said cut-out portions when the counterweight is removed, an inturned portion near the bottom of the said transversely disposed end member having a first vertically disposed aperture therethrough, the said counterweight having a second vertically disposed aperture adapted to align with the said first aperture, a removable pin adapted to be inserted from above into the said two apertures for removably connecting the said counterweight to the said frame and holding it thereon, the said counterweight also having a transverse slot in the rear face thereof providing access to the said pin when it is in position in the said apertures whereby the said pin also provides a hitch for connecting a trailer to the counterweighted vehicle.

References Cited in the file of this patent

UNITED STATES PATENTS

| | | |
|---|---|---|
| 1,756,106 | Swenson | Apr. 29, 1930 |
| 2,256,314 | Dunham | Sept. 16, 1941 |
| 2,526,613 | Tanguy | Oct. 17, 1950 |
| 2,719,639 | Gerst | Oct. 4, 1955 |

FOREIGN PATENTS

| | | |
|---|---|---|
| 134,423 | Australia | Apr. 29, 1948 |
| 676,365 | Great Britain | July 23, 1952 |